Aug. 7, 1945.　　　　C. E. PECK　　　　2,381,306
GAS GENERATOR UNIT
Filed Nov. 27, 1940　　　　2 Sheets-Sheet 1

WITNESSES:
Wm. B. Sellers.
Bernard L. Tangwell

INVENTOR
Clarence E. Peck.
BY O. O. Buchanan
ATTORNEY

Aug. 7, 1945.　　　C. E. PECK　　　2,381,306
GAS GENERATOR UNIT
Filed Nov. 27, 1940　　　2 Sheets-Sheet 2

WITNESSES:
Wm. B. Sellers.
Bernard L. Zangwill

INVENTOR
Clarence E. Peck.
BY O. B. Buchanan
ATTORNEY

Patented Aug. 7, 1945

2,381,306

UNITED STATES PATENT OFFICE 2,381,306

GAS GENERATOR UNIT

Clarence E. Peck, Wilkinsburg, Pa., assignor to Westinghouse Electric Corporation, East Pittsburgh, Pa., a corporation of Pennsylvania Application November 27, 1940, Serial No. 367,418

7 Claims. (Cl. 23—288)

This invention relates generally to an improved gas generator in which combustible hydrocarbon gases may be reacted with oxygen-containing gases, such as air, for obtaining a controlled or protective special atmosphere suitable for enveloping a charge, usually metallic, which is undergoing a heat treatment in a heat-treating furnace or cooling chamber, which atmosphere will always have a desired mixture of constituents.

My invention relates more particularly to that type of generator in which the combustible hydrocarbon gas, which may be commercially available artificial gas, natural gas, or other similar hydrocarbon gases, is endothermally reacted under controlled temperature conditions with controlled proportions of air for producing a product-gas which is rich in hydrogen and carbon monoxide but which has extremely small, and even negligible amounts of carbon dioxide, water vapor or methane. Such a product-gas also contains nitrogen in appreciable quantities depending upon the relative amounts of air and hydrocarbon gas supplied to the generator. A product-gas of this character can be used in numerous heat-treating processes and is especially useful in the heat-treatment of a wide range of high carbon and alloying tool steels without damage such as surface oxidation or decarburization.

Generators of the type described usually have a reaction chamber which is filled with a divided catalyst through which the gases to be reacted are caused to flow. The temperature of this chamber is preferably maintained in the range of about 1800-1900° F., and in order to have the chamber at a proper temperature throughout so that a complete reaction between the gases is produced, it is desirable to properly heat the catalyst, which can be done by providing the chamber with electrical heating units having a large heating area embedded in the catalyst. For suitable control of the heating elements one or more thermally-responsive devices can be used.

It is an object of my invention to provide a low-cost generator of the type described for producing product-gases of consistent composition which is rugged and and economical in use, and which can be easily assembled and disassembled.

An important feature of my invention resides in closely associating a thermal responsive means with the electrical heating elements of the gas generator so that the thermal responsive means responds rapidly and without appreciable time-lag to the temperature of the heating elements which necessarily are at a somewhat higher temperature than the catalyst in order to supply heat thereto.

A preferred form of the gas generator embodying my invention is provided with a vertical annular reaction chamber obtained by disposing a central core of refractory blocks within and spaced from a circular outer wall of larger dimensions, the outer wall also supporting the heating elements. This reaction chamber is filled with a suitable divided catalyst such as pieces of activated alumina, preferably one-half to one inch lumps, which completely surrounds the heating elements. By making the width of the annular reaction chamber relatively narrow, I have been able to obtain a very good control of the temperature therein.

The many objects, features and innovations of my invention, in addition to those specified above, will be apparent from the following description thereof which is to be taken in conjunction with the accompanying drawings, in which.

Figure 1:
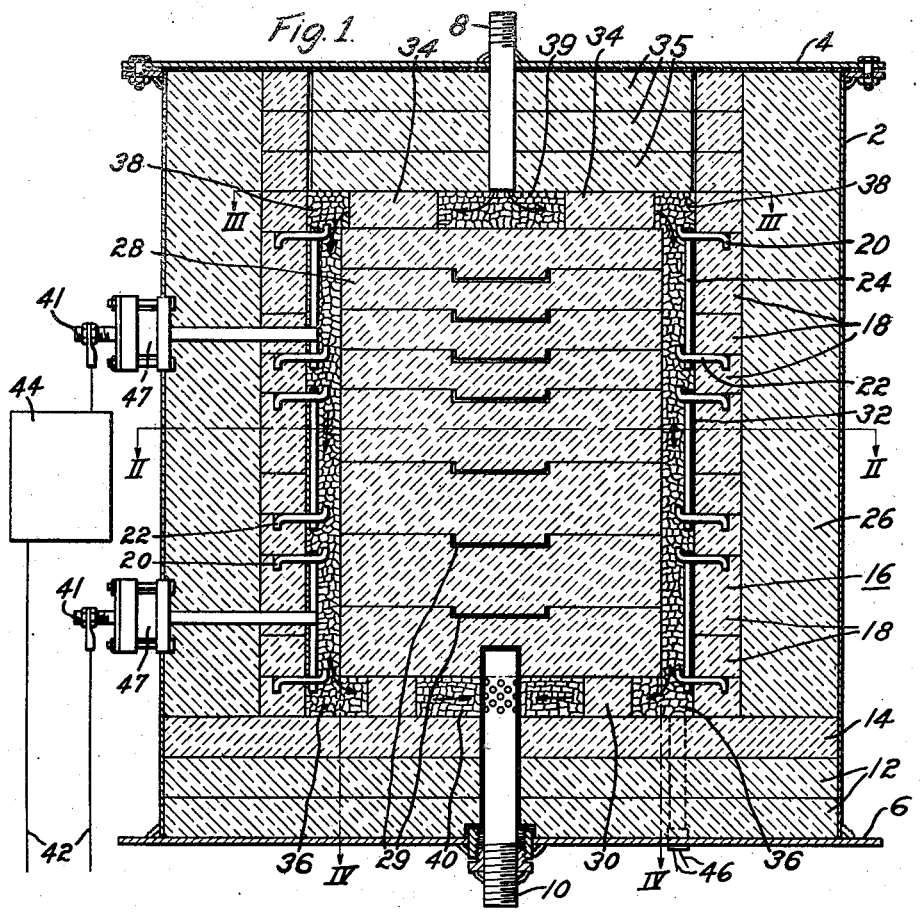
Figure 1 is a vertical sectional view centrally of a gas generator embodying my invention.
Figure 5:
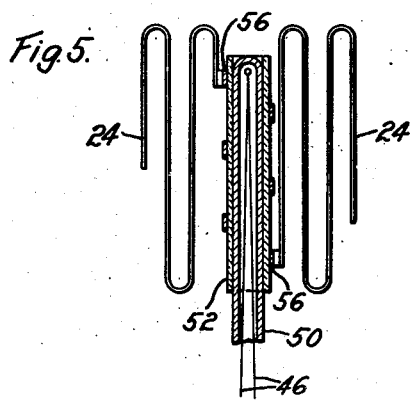
Figure 2:
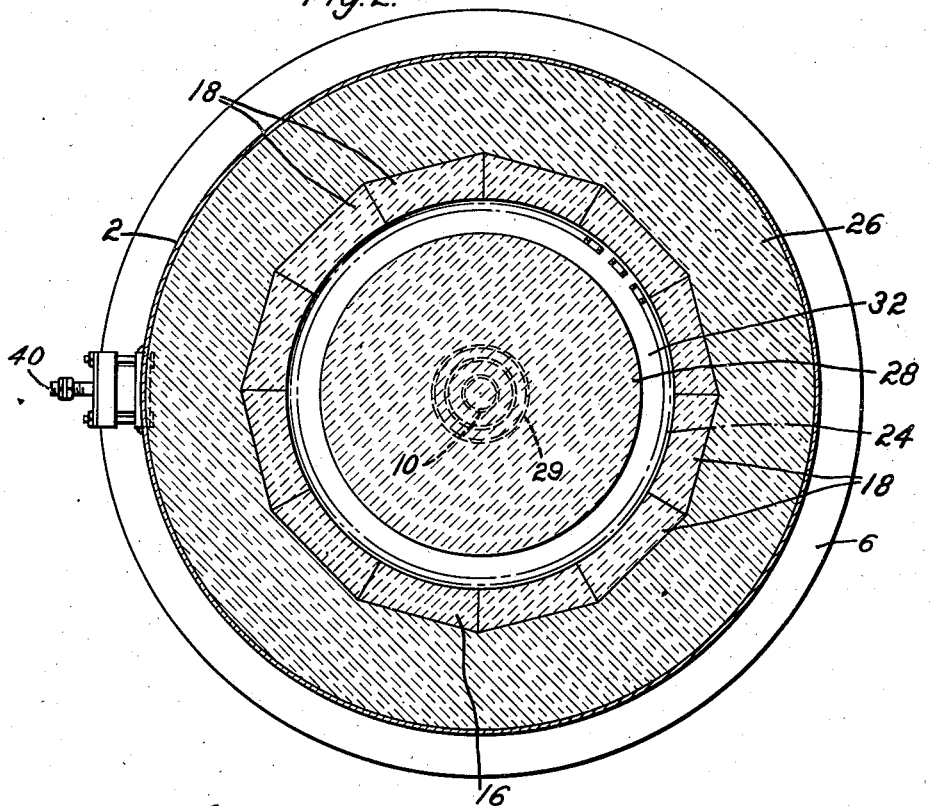
Fig. 2 is a horizontal sectional view on the line II—II of Fig. 1, with the catalyst omitted for clarity.
Figure 3:
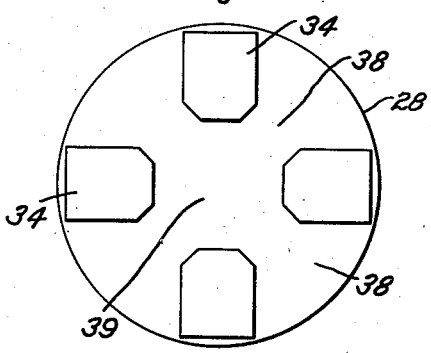
Figure 4:
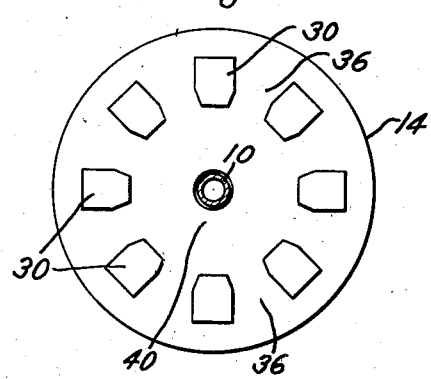

Figs. 3 and 4 are partial horizontal sectional views, on decreased scales, taken on the lines III—III and IV—IV, respectively, of Fig. 1; and Fig. 5 is an enlarged view, partly in section and partly in elevation, showing the manner in which a thermal responsive device is intimately associated with a heating element so as to respond substantially immediately to slight variations in the temperature of the heating element.

In the preferred form of my invention shown in the drawings, the gas generator includes an encasing outer metal container or shell comprising an upright metallic cylinder 2 to which is gas tightly secured a top plate 4 and a bottom plate 6, these plates each having a central aperture for receiving a gas inlet pipe 8 and a gas outlet pipe 10, respectively. The bottom plate 6 supports a bottom wall comprising insulating brick 12 and refractory tile 14 about the outlet pipe 10, the pipe extending a short distance above the bottom wall. A substantially hollow cylindrical wall 16 rests on the bottom wall and comprises a plurality of suitably shaped refractory blocks 18 provided with vertically spaced rows of circumferentially arranged cavities for receiving hanger hooks 20 and spacer pins 22 for supporting sinuous or return-bend heating elements 24 of the usual form, these heating elements being preferably made of a heat resistant metal such as a nickel-chromium alloy.

The wall 16 is spaced from the shell 2 to provide a substantial annular space which is filled with a heat insulating diatomaceous earth powder 26. Inwardly of the cylindrical inner side-surface of the wall 16 is a central core 28 formed of a plurality of superimposed circular refractory blocks or tile having interlocking means 29 in the form of a central groove in a lower block which receives a slightly smaller protuberance in an upper block. The bottom of the lowest block of this core is provided with a depression fitting the top of the outlet pipe 8 for anchoring the core. This core 28 rests upon a series of spaced refractory blocks 30 supported by the bottom wall, the core 28 having a cylindrical outer side-surface with a somewhat smaller diameter than that of the cylindrical side-surface of the wall 16 to provide an annular reaction chamber 32. A plurality of spacer blocks 34 is supported on top of the circular core 28 in spaced relation and a top wall 35 of insulating and refractory material completes the inside of the generator, this top wall encircling the inlet pipe 8.

The blocks 30 and 34 are inward of the outer periphery of the core and provide somewhat radial passages 36 and 38, respectively, for the flow of gas through the generator, the blocks 34 being arranged to provide a central space 39 for receiving and distributing the gas from the inlet pipe 8 to the passages 38 which direct the gases to the top of the reaction chamber from whence the gases flow downwardly to the bottom of the reaction chamber and then through the spaces 36 between the blocks 30 into a central collecting chamber 40 about the outlet pipe 10, the portion of the pipe in this collection chamber being provided with numerous holes for the passage of the product-gas into the outlet pipe 10. The aforesaid paths between the inlet pipe and outlet pipe are filled with a catalyst, although the top passages above the reaction chamber need not necessarily be provided with a catalyst. The catalyst further envelopes the heating units 24 so that in flowing through the gas generator the inlet gases are throughly reacted in the presence of a heated catalyst.

The heating elements 24 are preferably disposed somewhat closer to the wall 16 than to the central core 28, since the heat losses radially outwardly of the generator are greater than the heat losses inwardly of the reaction chamber, thereby providing a more uniform temperature throughout the reaction chamber. Power is supplied to the heating elements through leads 41 connecting to a suitable source of supply 42, the energy supplied being controlled by any suitable control mechanism 44 under control of a thermo-responsive means including a thermocouple 46. The leads 41 pass through the outer shell 2 through any suitable gas-tight terminal connections 47.

The thermo-responsive means passes through the bottom plate 6 through any suitable gas-tight gland and may comprise a tube 50 closed at one end and receiving the thermocouple 46, a thin porcelain tube 52 placed about the tube 50 in intimate contact therein, and a helical heating element tightly wound around this porcelain tube so that the thermocouple quickly responds to the temperature of the heating element without any appreciable time lag. The helical portion of the heating element is provided with end lugs 56 to which are welded the contiguous parts of a heating element 24. If desired, a similar construction may be utilized for a protective fuse.

In the actual construction of the generator, the bottom gas passages are filled with the catalyst and then the central refractory blocks are placed in position after the heating units have been mounted on the wall 16. As these blocks are placed in position, catalyst is added to fill the part of the reaction chamber created by the insertion of the individual blocks. The top wall 35 is preferably dry laid and the top plate 4 bolted to suitable flanges on the shell 2 with a gasket interposed to provide a gas-tight joint and to enable ready disassembly of the unit for inspection or for any other purpose.

Generators of various capacity may be economically and easily built in accordance with the foregoing teachings since the diametrical dimensions of the center refractory blocks and the wall 16 can be selected to provide an annular reaction chamber having different circumferential lengths. In general, I prefer to maintain the width of the reaction chamber for the different capacities constant at approximately two inches. For a thousand cubic feet per hour unit, a reaction chamber having a length of approximately thirty inches and an average diameter of twenty-two inches is suitable for reacting a very rich mixture of illuminating gas and air.

In a gas generator built in accordance with my invention, I have found that all of the inlet gas flows through the reaction chamber, the interstices between the pieces of catalyst providing a passage of considerably less resistance than any possible penetration path of the gas through the walls although dense refractory blocks can be used as a precaution against such seepage of gas.

This invention is of the nature of an improvement of the gas generator shown, described and claimed in my copending application Serial No. 324,410, filed March 16, 1940, and the copending application of J. R. Gier, Serial No. 270,873, filed April 29, 1939, both assigned to the Westinghouse Electric & Manufacturing Company. Application Serial No. 270,873 has matured into Patent No. 2,235,401, issued March 18, 1941.

I claim as my invention:

1. A structure of the class described in which hydrocarbon gases are to be reacted with oxygen-containing gases, comprising a metal casing including a metal top, a metal bottom and metal sides, heat-insulation adjacent said top, a firebrick wall on said bottom, a heat-resisting and insulating lining means for said sides, a solid central heat-resistant core having an outer contour generally following, and smaller than, that of the inner surface of said lining means, to provide a reaction chamber with said lining means, spaced piers on said firebrick wall below, and supporting, said core, gas inlet means for admitting a mixture of gases to be reacted to said chamber, heating means for continually heating said chamber, a gas outlet means for product-gases after said mixture has passed through said chamber, said gas outlet means including passages formed by the spaces between said piers.

2. A structure of the class described in which hydrocarbon gases are to be reacted with oxygen-containing gases in the presence of a catalyst, comprising a metal casing including a metal top, a metal bottom and metal sides, heat-insulation adjacent said top, a firebrick wall on said bottom, a heat-resisting and insulating lining means for said sides, a solid central heat-resistant core having an outer contour generally following, and smaller than, that of the inner surface of said lining means, to provide a reaction chamber with said lining means, spaced piers on said firebrick wall below, and supporting, said core, gas inlet means for admitting a mixture of gases to be reacted to said chamber, a divided catalyst substantially filling said chamber, electrical heating-means in said chamber embedded in said catalyst, said heating means being supported closer to said lining means than to said core, a gas outlet means for product-gases after said mixture has passed through said chamber, said gas outlet means including passages formed by the spaces between said piers.

3. A structure of the class described in which hydrocarbon gases are to be reacted with oxygen-containing gases, comprising a metal casing including a metal top, a metal bottom and metal sides, heat-insulation adjacent said top, a firebrick wall on said bottom, a heat-resisting and insulating lining means for said sides, a solid central heat-resistant core having an outer contour generally following, and smaller than, that of the inner surface of said lining means, to provide a reaction chamber with said lining means, spaced piers on said firebrick wall below said core, said piers providing communicating passages from said reaction chamber and a gas-collecting chamber, spaced piers on said core providing a distributing chamber and communicating passages to said reaction chamber, heating means for said reaction chamber, gas inlet means for admitting a mixture of gases to said distributing chamber, and gas outlet means from said collecting chamber.

4. A structure of the class described in which hydrocarbon gases are to be reacted with oxygen-containing gases in the presence of a catalyst, comprising a metal casing including a metal top, a metal bottom and metal sides, heat-insulation adjacent said top, a firebrick wall on said bottom, a heat-resisting and insulating lining means for said sides, a solid central heat-resistant core having an outer contour generally following, and smaller than, that of the inner surface of said lining means, to provide a reaction chamber with said lining means, spaced piers on said firebrick wall below said core, said piers providing communicating passages from said reaction chamber and a gas collecting chamber, spaced piers on said core providing a distributing chamber and communicating passages to said reaction chamber, heating means for said reaction chamber, gas inlet means for admitting a mixture of gases to said distributing chamber, gas outlet means from said collecting chamber, and a divided catalyst substantially filling said reaction chamber and the first said communicating passages.

5. A structure of the class described in which hydrocarbon gases are to be reacted with oxygen-containing gases in the presence of a catalyst, comprising a metal casing including a metal top, a metal bottom and metal sides, heat-insulation adjacent said top, a firebrick wall on said bottom, a heat-resisting and insulating lining means for said sides, a solid central heat-resistant core having an outer contour generally following, and smaller than, that of the inner surface of said lining means, to provide a reaction chamber with said lining means, spaced piers on said firebrick wall below said core, said piers providing communicating passages from said reaction chamber and a gas collecting chamber, spaced piers on said core providing a distributing chamber and communicating passages to said reaction chamber, gas inlet means for admitting a mixture of gases to said distributing chamber, gas outlet means from said collecting chamber, a divided catalyst substantially filling said reaction chamber and the first said communicating passages, and electrical heating means embedded in said catalyst for continually heating said reaction chamber.

6. Means for reacting hydrocarbon gases with oxygen-containing gases, such as air, in the presence of a catalyst for producing a product-gas useful in metal heat-treating, comprising non-metallic refractory outer walls providing an inner compartment, said outer walls including a bottom for said compartment, having a central opening, a non-metallic refractory central inner core having a bottom, said core being spaced from said outer walls for providing an annular gas-reaction chamber, said core being of less length than said inner compartment for providing a gas-distributing chamber at one end of said gas-reaction chamber and a gas-receiving chamber at the other end thereof, a gas-tight metallic outer casing for said outer walls, a gas-pervious divided catalyst in said gas-reaction chamber, gas inlet means gas-tightly passing through said casing for conveying aforesaid gases, to be reacted, to said gas-distributing chamber, gas outlet means for reacted gases, comprising a pipe gas-tightly passing through said casing and passing through said opening, a plurality of spaced members radially outward from said pipe, associated with said bottoms for supporting said core, said spaced members being in said gas-receiving chamber and providing gas-passages between said annular chamber and said pipe, and an electrical heating means inside said casing for heating said catalyst.

7. Means for reacting hydrocarbon-containing gases with oxygen-containing gases in the presence of a catalyst for producing a product-gas useful in metal heat-treatment, comprising non-metallic refractory outer walls providing an inner compartment, said outer walls including a bottom for said compartment having a central opening, a gas-tight outer casing for said outer walls, gas-inlet and gas-outlet means passing through said casing at the opposite ends of said compartment, a central refractory member in said compartment, said member having an outer side-surface smaller than the inner side-surface of said outer walls, distinct supporting means for supporting the bottom of said member in spaced relation above said compartment-bottom, with said side-portions in spaced relation for providing an annular gas-reaction chamber of relatively significant width in comparison to its length, a gas-pervious catalyst in said gas-reaction chamber, said supporting means being so constructed as to permit the passage of gas between said annular gas-reaction chamber and said central opening, and electrical heating means inside said casing.

CLARENCE E. PECK.